United States Patent [19]

Koestner

[11] Patent Number: 4,719,717

[45] Date of Patent: Jan. 19, 1988

[54] TRAILER HOOK FISHING APPARATUS

[76] Inventor: John A. Koestner, Rural Rte. 3 Box 120, Webster City, Iowa 50595

[21] Appl. No.: 921,267

[22] Filed: Oct. 21, 1986

[51] Int. Cl.⁴ .................................... A01K 83/06
[52] U.S. Cl. ................................ 43/44.2; 43/44.8
[58] Field of Search ............... 43/44.2, 44.8, 44.83, 43/44.84, 42.74, 43.1

[56] References Cited

U.S. PATENT DOCUMENTS

| | | | |
|---|---|---|---|
| 2,700,242 | 1/1955 | Porth | 43/44.4 |
| 2,755,593 | 7/1956 | Thurman | 43/44.2 |
| 2,854,781 | 10/1958 | Scozzari | 43/44.2 |
| 2,860,443 | 11/1958 | Robinson | 43/44.4 |
| 2,871,611 | 2/1956 | Shepard | 43/44.83 |
| 2,916,846 | 12/1959 | Smith | 43/44.4 |
| 3,105,319 | 10/1963 | Whalen | 43/44.4 |
| 3,744,179 | 7/1973 | Smith | 43/44.4 |

FOREIGN PATENT DOCUMENTS

| | | | |
|---|---|---|---|
| 23217 | of 1894 | United Kingdom | 43/44.2 |
| 23457 | of 1895 | United Kingdom | 43/44.2 |

*Primary Examiner*—Gene P. Crosby
*Attorney, Agent, or Firm*—Henderson & Strum

[57] ABSTRACT

A fishing apparatus including a wire yoke designed to extend around the bottom of and to each side of a tail portion of a minnow. A straight bendable wire shank member is connected at one end thereof to the top end of one side of the yoke and extends substantially horizontally in use when attached to a minnow. This shank member is designed to extend through a tail section of a minnow. A downwardly extending member on the top of the other side of the yoke is provided for selectively holding the other end of the shank member from bending upwardly when disposed within such downwardly extending member, but permitting the shank member to bend downwardly and outwardly to become disengaged from such downwardly extending member such that the free end of the shank member, when unlocked, can be pushed through the tail section of a minnow and then locked into place under the downwardly extending member. A hook is connected to the bottom of the wire yoke. In use, the aforementioned structure is typically tied by a flexible member between the yoke and another hook extending through the mouth portion of a minnow or other bait fish.

4 Claims, 5 Drawing Figures

TRAILER HOOK FISHING APPARATUS

TECHNICAL FIELD

This present invention relates generally to a fishing apparatus, and more particularly to an improved apparatus for holding a trailer hook in a proper position on a minnow or other bait fish while using such minnows as bait.

BACKGROUND ART

When fishing with minnows and a single hook, the hook obviously can go through the minnow at only one place. It is fairly common that a fish will grasp the tail portion of a minnow only, often biting it into two pieces and never getting hooked on the single hook. For this reason, devices have been designed for utilizing a hook which extends backwardly toward the tail of a minnow, for example as shown in U.S. Pat. No. 2,860,443 to Robinson and U.S. Pat. No. 2,916,846 to Smith. Other solutions to the problem are to prepare a bait harness for bait fish which has a plurality of hooks placed at various positions on or around such bait fish. U.S. Pat. No. 2,700,242 to Porth, U.S. Pat. No. 3,105,319 to Whalen and U.S. Pat. No. 3,744,179 to Smith all show different bait harness constructions.

The problem with all of the aforementioned prior art devices is that it is extremely difficult to hold the hooks at the proper position on a minnow or the like without making the minnow look or act unnatural. Consequently, there is a need for an apparatus for presenting bait fish in a natural live condition, while at the same time holding the hook near the tail where many fish tend to bite.

DISCLOSURE OF THE INVENTION

The present invention relates to a fishing apparatus including a wire yoke designed to extend around the bottom of and to each side of a tail portion of a minnow. A straight bendable wire shank member is connected at one end thereof to the top end of one side of the yoke and extends substantially horizontally in use when attached to a minnow. This shank member is designed to extend through a tail section of a minnow. A downwardly extending member on the top of the other side of the yoke is provided for selectively holding the other end of the shank member from bending upwardly when disposed within such downwardly extending member, but permitting the shank member to bend downwardly and outwardly to become disengaged from such downwardly extending member such that the free end of the shank member, when unlocked, can be pushed through the tail section of a minnow and then locked into place under the downwardly extending member. A hook is connected to the bottom of the wire yoke. In use, the aforementioned structure is typically tied by a flexible member between the yoke and another hook extending through the mouth portion of a minnow or other bait fish.

An object of the present invention is to provide an improved apparatus for fishing with bait fish such as minnows or chubs.

Another object of the present invention is to provide an apparatus for holding a trailing hook in a position just below the tail section of a bait fish, which happens to be where most fish bite on a bait fish.

A further object of the present invention is to provide a fishing apparatus of the aforementioned type which is economical to produce, simple to install and dependable to use.

Other objects, advantages, and novel features of the present invention will become apparent from the following detailed description of the invention when considered in conjunction with the accompanying drawings.

BEST MODE FOR CARRYING OUT THE INVENTION

Figure 1:
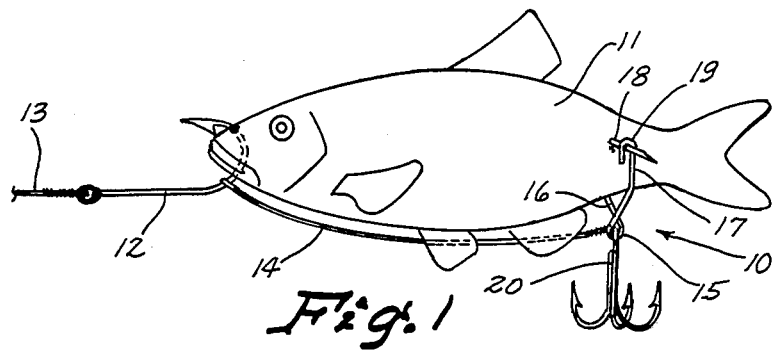
FIG. 1 is a side elevational view of the present invention shown attached to a bait fish in an ideal rigging situation.
Figure 2:
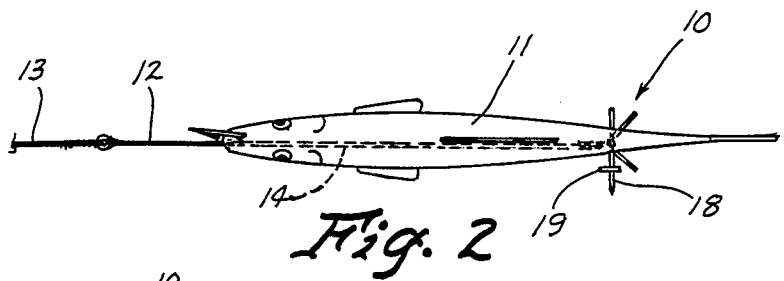
FIG. 2 is a top view of FIG. 1.

Referring now to the drawings, wherein like reference numerals designate identical or corresponding parts throughout the several views, FIG. 1 shows an apparatus (10) constructed in accordance with the present invention shown connected to a bait fish (11). The apparatus (10) is preferably used in conjunction with a normal single fish hook (12) connected to a fishing pole or the like by a line (13) which extends through the mouth section of the minnow (11) and has a flexible line (14) attached to the hook (12) at one end thereof and to an eye section (15) on the preferred embodiment of the invention (10).

Figures 3, 4:
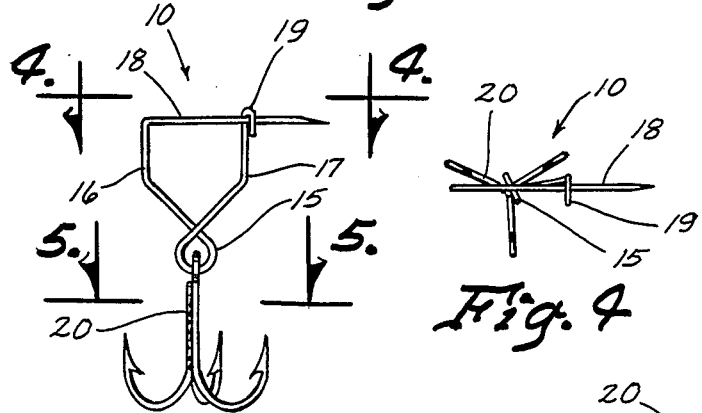
FIG. 3 is an enlarged front view of the preferred embodiment of the present invention shown without a minnow being attached thereto.
FIG. 4 is a view taken along line 4—4 of FIG. 3.
Figure 5:
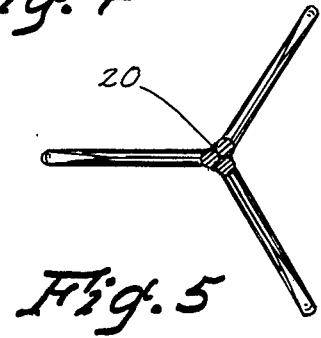
FIG. 5 is a view taken along line 5—5 of FIG. 3.

Referring to FIG. 3, it is noted that a yoke is formed by wire sections (16 and 17) and that a wire shank member (18) is connected to the top of yoke section (16). A hook portion (19) extends over the free end of the pointed shank (18) when it is attached to a bait fish (11), shown in FIG. 1, but the shank (18) is bendable such that it can be bend downwardly and outwardly so that it will come out from under the downwardly extending portion (19) so that it can be pushed through the tail section of a bait fish (11) and then again pushed downwardly and inwardly to relock it underneath the member (19) in the position shown in FIGS. 1 and 3, since it is made of wire which will return to the shape shown in FIG. 3 even after being bent into other shapes. The eye (15) holds a treble hook (20) in a proper position just below the tail section of the bait fish (11), which is a common area that fish grab onto when chasing a bait fish.

In operation of the present invention, the preferred embodiment (10) of the present invention is preferably tied to a hook (12) by a line (14) in the manner shown in FIG. 1. The bait fish (11) would typically first be hooked through the mouth by the use of hook (12) and then the shank (18), in an unlocked position, would be pushed through the tail section in a position shown in FIG. 1 and then relocked under the downwardly depending member (19). Then the angler can cast the bait fish into the water and either still fish, troll, or drift fish. If a fish grabs the tail section of the bait fish (11), it will almost always be hooked by the treble hook (20). If, however, the fish strikes the front end of the bait fish (11), then it would normally be caught by the single hook (12).

Accordingly, it will be appreciated that the present invention does indeed accomplish the aforementioned objects. Obviously, many modifications and variations of the present invention are possible in light of the above teachings. It is therefore to be understood that, within the scope of the appended claims, the invention may be practised otherwise than as specifically described.

I claim:

1. Fishing apparatus comprising:
   a wire yoke having a bottom and two upstanding side portions;
   a straight bendable wire shank member connected at one end thereof to the top end of one of said upstanding side portions and extending at least mostly horizontal in use;
   downwardly extending means connected to the top of the other of said two upstanding side portions for selectively holding the other end of said shank member from bending upwardly when disposed within said downwardly extending means but permitting said shank member to bend downwardly and outwardly to become disengaged from said downwardly extending means; and
   means in the middle of the bottom of said wire yoke for centrally attaching a fish hook to said yoke.

2. The apparatus of claim 1 including a second hook adapted to be connected to a fishing line and flexible line means attached to said second hook and to said attaching means for connecting said second hook to said wire yoke.

3. The apparatus of claim 1 in combination with a minnow having a spine extending longitudinally therethrough, said straight bendable wire shank member extending through a rear portion of said minnow and being transversely disposed with respect to said spine.

4. The apparatus of claim 1 including a fish hook attached to said attaching means.

* * * * *